United States Patent
Suzuki et al.

(10) Patent No.: US 11,472,952 B2
(45) Date of Patent: Oct. 18, 2022

(54) RUBBER COMPOSITION FOR ANTI-VIBRATION RUBBER

(71) Applicant: NOK CORPORATION, Tokyo (JP)

(72) Inventors: Akihiro Suzuki, Kanagawa (JP); Tomohiro Kaise, Tottori (JP)

(73) Assignee: NOK CORPORATION, Tokyo (JP)

( * ) Notice: Subject to any disclaimer, the term of this patent is extended or adjusted under 35 U.S.C. 154(b) by 548 days.

(21) Appl. No.: 16/606,632

(22) PCT Filed: Jun. 5, 2018

(86) PCT No.: PCT/JP2018/021480
§ 371 (c)(1),
(2) Date: Oct. 18, 2019

(87) PCT Pub. No.: WO2018/235587
PCT Pub. Date: Dec. 27, 2018

(65) Prior Publication Data
US 2021/0108060 A1    Apr. 15, 2021

(30) Foreign Application Priority Data
Jun. 22, 2017  (JP) .............................. JP2017-122134

(51) Int. Cl.
| | | |
|---|---|---|
| *C08L 23/16* | (2006.01) | |
| *C08K 3/04* | (2006.01) | |
| *F16F 1/36* | (2006.01) | |
| *F16F 15/00* | (2006.01) | |
| *F16F 7/12* | (2006.01) | |

(52) U.S. Cl.
CPC ............ *C08L 23/16* (2013.01); *F16F 1/3605* (2013.01); *C08K 3/04* (2013.01); *C08L 2205/025* (2013.01); *C08L 2312/00* (2013.01); *F16F 7/12* (2013.01); *F16F 15/00* (2013.01); *F16F 2224/005* (2013.01); *F16F 2224/025* (2013.01); *F16F 2226/04* (2013.01); *F16F 2228/007* (2013.01)

(58) Field of Classification Search
None
See application file for complete search history.

(56) References Cited

U.S. PATENT DOCUMENTS

| | | |
|---|---|---|
| 2009/0239014 A1 | 9/2009 | Noguchi et al. |
| 2013/0030103 A1 | 1/2013 | Hasegawa |

FOREIGN PATENT DOCUMENTS

| | | |
|---|---|---|
| JP | 03-227343 | 10/1991 |
| JP | 07-138429 | 5/1995 |
| JP | 11-172145 | 6/1999 |
| JP | 2001-002867 | 1/2001 |
| JP | 2001-049143 | 2/2001 |
| WO | WO 2009/072553 A1 | 6/2009 |
| WO | WO 2011-129168 A1 | 10/2011 |

OTHER PUBLICATIONS

International Search Report from corresponding PCT application No. PCT/JP2018/021480 dated Jul. 17, 2018 (4 pgs).
International Search Report and Written Opinion from corresponding PCT application No. PCT/JP2018/021480 dated Jan. 2, 2020 (6 pgs).

*Primary Examiner* — Richard A Huhn

(57) ABSTRACT

A rubber composition for anti-vibration rubber comprising, based on 100 parts by weight of ethylene-propylene-diene-based copolymer rubber (EPDM):
(A) 32 to 60 parts by weight of carbon black A having an average particle diameter of 60 to 100 nm, an iodine absorption amount of 14 to 23 g/kg, and a DBP oil absorption amount of 100 ml/100 g or more;
(B) 10 to 30 parts by weight of carbon black B having an average particle diameter of 40 to 50 nm, an iodine absorption amount of 35 to 49 g/kg, and a DBP oil absorption amount of 100 to 160 ml/100 g;
(C) 2 to 10 parts by weight of ethylene-α-olefin copolymer; and
(D) 0 to 16 parts by weight of silica. The rubber composition for anti-vibration rubber that has low dynamic magnification (small increase in elastic modulus associated with an increase in rubber deformation rate), excellent durability (bearing force against breakage due to repeated deformation of rubber), excellent heat resistance, etc., and that can be effectively used as a vulcanization molding material for a center bearing support, etc.

10 Claims, No Drawings

RUBBER COMPOSITION FOR ANTI-VIBRATION RUBBER

RELATED APPLICATION

This application is a 35 U.S.C. § 371 national phase filing of International Patent Application No. PCT/JP2018/021480, filed Jun. 5, 2018, which claims priority under 35 U.S.C. § 119 to Japanese Patent Application No. 2017-122134, filed Jun. 22, 2017, the entire disclosure of which is hereby expressly incorporated by reference.

TECHNICAL FIELD

The present invention relates to a rubber composition for anti-vibration rubber. More particularly, the present invention relates to a rubber composition for anti-vibration rubber that can be effectively used as, for example, a vulcanization molding material for a center bearing support that provides anti-vibration support to a vehicle propeller shaft.

BACKGROUND ART

Various types of anti-vibration rubber are required to have anti-vibration function to absorb and suppress the vibration of supporting a heavy load, and also required to have high strength properties for supporting the heavy load. Moreover, along with the increased output and performance of vehicles, for example, the temperature of environment near a center bearing support that provides anti-vibration support to a propeller shaft (shaft that transmits mobile power from an engine to a rear-wheel differential) has recently tended to increase. Increasing demands are being placed on further improvement of heat resistance of the materials to be used therefor. Furthermore, improvement of durability for reliability enhancement, and improvement of anti-vibration properties for vehicle quietness are necessary issues.

Conventionally used molding materials for center bearing supports are natural rubber, natural rubber/SBR-blended rubber, chloroprene rubber, SBR/EPDM-blended rubber, chlorinated polyethylene, ethylene-propylene-diene-based copolymer rubber, and the like (see Patent Documents 1 to 3). For recent demands for performance improvement of center bearing supports, it has been becoming difficult to satisfy function, in terms of heat resistance, durability, etc. In addition, a further reduction in dynamic magnification (static-dynamic ratio) has been also required.

PRIOR ART DOCUMENTS

Patent Documents

Patent Document 1: JP-A-2001-2867
Patent Document 2: JP-A-2001-49143
Patent Document 3: JP-A-3-227343

OUTLINE OF THE INVENTION

Problem to be Solved by the Invention

An object of the present invention is to provide a rubber composition for anti-vibration rubber that has low dynamic magnification (small increase in elastic modulus associated with an increase in rubber deformation rate), excellent durability (bearing force against breakage due to repeated deformation of rubber), excellent heat resistance, etc., and that can be effectively used as a vulcanization molding material for center bearing supports, etc.

Means for Solving the Problem

The above object of the present invention can be achieved by a rubber composition for anti-vibration rubber comprising, based on 100 parts by weight of ethylene-propylene-diene-based copolymer rubber:

(A) 32 to 60 parts by weight of carbon black A having an average particle diameter of 60 to 100 nm, an iodine absorption amount of 14 to 23 g/kg, and a DBP oil absorption amount of 100 ml/100 g or more;
(B) 10 to 30 parts by weight of carbon black B having an average particle diameter of 40 to 50 nm, an iodine absorption amount of 35 to 49 g/kg, and a DBP oil absorption amount of 100 to 160 ml/100 g;
(C) 2 to 10 parts by weight of an ethylene-α-olefin copolymer; and
(D) 0 to 16 parts by weight of silica.

Effect of the Invention

In the rubber composition according to the present invention, EPDM is compounded with two types of carbon black, i.e., (A) carbon black A having an average particle diameter of 60 to 100 nm, an iodine absorption amount of 14 to 23 g/kg, and a DBP oil absorption amount of 100 ml/100 g or more, and (B) carbon black B having an average particle diameter of 40 to 50 nm, an iodine absorption amount of 35 to 49 g/kg, and a DBP oil absorption amount of 100 to 160 ml/100 g. These are further compounded with (C) ethylene-α-olefin copolymer, whereby the resulting anti-vibration rubber has excellent effects in that it has low dynamic magnification (static-dynamic ratio) per constant hardness, and excellent strength properties, fatigue resistance, and heat resistance.

EMBODIMENTS FOR CARRYING OUT THE INVENTION

The rubber composition for anti-vibration rubber of the present invention comprises, based on 100 parts by weight of EPDM: (A) 32 to 60 parts by weight of carbon black A having an average particle diameter of 60 to 100 nm, an iodine absorption amount of 14 to 23 g/kg, and a DBP oil absorption amount of 100 ml/100 g or more; (B) 10 to 30 parts by weight of carbon black B having an average particle diameter of 40 to 50 nm, an iodine absorption amount of 35 to 49 g/kg, and a DBP oil absorption amount of 100 to 160 ml/100 g; and (C) 2 to 10 parts by weight of ethylene-α-olefin copolymer. The proportion of these components is adjusted so that the rubber hardness (Hs) of anti-vibration rubber after crosslinking is 60 to 80. If the rubber hardness of anti-vibration rubber after crosslinking is less than this range, elasticity sufficient for supporting propeller shafts cannot be obtained. In contrast, if the rubber hardness of anti-vibration rubber after crosslinking is greater than this range, the dynamic magnification increases, and desired anti-vibration effects cannot be obtained.

As EPDM, any products obtained by copolymerization of ethylene and propylene with a small amount of various non-conjugated diene components can be used. As non-conjugated diene, preferably, a product obtained by copolymerization with 5-ethylidene-2-norbornene, dicyclopentadiene, 1,4-hexadiene, or the like is used.

Carbon black A as the component (A) is one having an average particle diameter of 60 to 100 nm, an iodine absorption amount of 14 to 23 g/kg, and a DBP oil absorption amount of 100 ml/100 g or more, preferably 100 to 160 ml/100 g. For example, SRF-HS-HF carbon black is used at a ratio of 32 to 60 parts by weight, preferably 35 to 55 parts by weight, based on 100 parts by weight of EPDM. Carbon black A is used as carbon for reducing dynamic magnification. If the amount of carbon black A used is less than this range, the effect for the target dynamic magnification is insufficient. In contrast, if the amount of carbon black A used is greater than this range, agglomerate (secondary agglomerate of carbon black) causes remarkable breakage, and the durability is deteriorated.

Carbon black B as the component (B) is one having an average particle diameter of 40 to 50 nm, an iodine absorption amount of 35 to 49 g/kg, and a DBP oil absorption amount of 100 to 160 ml/100 g. For example, FEF carbon black is used at a ratio of 10 to 30 parts by weight, preferably 15 to 25 parts by weight, based on 100 parts by weight of EPDM. Carbon black B is used to impart reinforcement and improve the dispersibility of carbon black A. If the amount of carbon black B used is less than this range, the effect of improving dispersibility is insufficient, and the durability is deteriorated. In contrast, if the amount of carbon black B used is greater than this range, agglomerate (secondary agglomerate of carbon black) causes remarkable breakage, and the durability is deteriorated.

Ethylene-α-olefin copolymer as the component (C) is used at a ratio of 2 to 10 parts by weight, preferably 3 to 7 parts by weight, based on 100 parts by weight of EPDM. As α-olefins, one having 3 to 10 carbon atoms is used. For this, commercial products, such as TAFMER A4085 (produced by Mitsui Chemicals, Inc.), can be used as they are. If the ratio of the ethylene-α-olefin copolymer used is less than this range, the dynamic magnification is inferior. In contrast, if the ratio of the ethylene-α-olefin copolymer used is greater than this range, processability using an open roll is deteriorated.

In addition to the above essential components, silica (D) can be further used, in terms of reducing dynamic magnification. As the silica, one having a BET method specific surface area (according to ASTM D-1993-03) of 150 to 300 m$^2$/g, preferably 180 to 230 m$^2$/g, is used at a ratio of 16 parts by weight or less, preferably 2 to 16 parts by weight, based on 100 parts by weight of EPDM.

As a crosslinking agent, organic peroxide (E) is used. Examples thereof include t-butyl peroxide, dicumyl peroxide, t-butylcumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexyne-3, 1,3-di(t-butylperoxyisopropyl)benzene, 2,5-dimethyl-2,5-di(benzoylperoxy)hexane, t-butylperoxy benzoate, t-butylperoxy isopropyl carbonate, n-butyl-4,4'-di(t-butylperoxy)valerate, and the like.

The organic peroxide is used in a proportion of 1 to 8 parts by weight, preferably 2 to 7 parts by weight, based on 100 parts by weight of the EPDM. If the proportion is less than this range, sufficient crosslinking density is not obtained, and heat resistance and compression set characteristics are inferior. In contrast, if the proportion is greater than this range, a crosslinking-molded product cannot be obtained due to foaming. Sulfur or a sulfur-containing compound (F) can also be used in combination as a vulcanizing agent. The sulfur or sulfur-containing compound is used at a weight ratio of about 1/10 or less, preferably about 1/30 to 1/20, with respect to the organic peroxide.

In addition to the above components, compounding agents generally used in the rubber industry are suitably added to the composition, within a range that does not impair the properties. Examples of the compounding agent include processing aids, such as stearic acid, palmitic acid, paraffin wax, process oil and liquid polybutadiene; acid acceptors, such as oxide or hydroxide of a divalent metal (e.g. zinc oxide, magnesium oxide, etc.) and hydrotalcite; plasticizers; antiaging agents; and the like.

The above components are kneaded using an open roll, a Banbury mixer, a kneader, or the like. Using a compression molding machine, an impregnation molding machine, or an injection molding machine, the kneaded material is vulcanization-molded into predetermined anti-vibration rubber products, such as a center bearing support, at a temperature of about 140 to 250° C. at a pressure of about 2 to 50 MPa for 1 to 30 minutes.

EXAMPLES

The following describes the present invention with reference to Examples.

Example 1

| | |
|---|---|
| EPDM (Keltan6750, produced by Lanxess) | 100 parts by weight |
| Carbon black A (Seast G- SWA, produced by Tokai Carbon Co., Ltd. average particle diameter: 60 to 100 nm iodine absorption amount: 14 to 23 g/kg; DBP oil absorption amount: 100 ml/100 g or more) | 46 parts by weight |
| Carbon black B (Seast G-SO, produced by Tokai Carbon Co., Ltd. average particle diameter: 40 to 50 nm iodine absorption amount: 35 to 49 g/kg; DBP oil absorption amount: 100 to 160 ml/100 g) | 18 parts by weight |
| Ethylene-α-olefin copolymer (TAFMER A4085, produced by Mitsui Chemicals) | 5 parts by weight |
| Silica (Nipsil LP, produced by Toso-Silica Co.) | 10 parts by weight |
| Organic Peroxide (Percumyl D, produced by NOF Corporation) | 2 parts by weight |
| Sulfur | 0.1 parts by weight |

The above blending components were kneaded with a kneader and an open roll. The kneaded product was then subjected to press crosslinking at 180° C. for 6 minutes, and a test piece was obtained.

Example 2

In Example 1, the amount of the carbon black A was changed to 39 parts by weight, and that of the carbon black B was changed to 15 parts by weight, respectively.

Example 3

In Example 1, the amount of the carbon black A was changed to 53 parts by weight, and that of the carbon black B was changed to 21 parts by weight, respectively.

Comparative Example 1

In Example 1, the amount of the carbon black A was changed to 25 parts by weight, and that of the carbon black B was changed to 29 parts by weight, respectively.

Comparative Example 2

In Example 1, the amount of the carbon black A was changed to 63 parts by weight, and that of the carbon black B was changed to 11 parts by weight, respectively.

Comparative Example 3

In Example 1, the amount of the carbon black A was changed to 50 parts by weight, and that of the carbon black B was changed to 5 parts by weight, respectively.

Comparative Example 4

In Example 1, the amount of the carbon black A was changed to 30 parts by weight, and that of the carbon black B was changed to 35 parts by weight, respectively.

Comparative Example 5

In Example 1, the same amount (5 parts by weight) of ethylene-vinyl acetate copolymer (Levaprene 500, produced by Bayer) was used in place of ethylene-α-olefin copolymer.

Comparative Example 6

In Example 1, the same amount (5 parts by weight) of aromatic modified terpene resin (YS RESIN TO105, produced by Yasuhara Chemical Co., Ltd.) was used in place of ethylene-α-olefin copolymer.

Comparative Example 7

In Example 1, ethylene-α-olefin copolymer was not used.

Comparative Example 8

In Example 1, rubber composition of the following composition was used.

| | |
|---|---|
| SBR (SBR1502, produced by Zeon Corporation) | 50 parts by weight |
| BR (BR1250H, produced by Zeon Corporation) | 15 parts by weight |
| EPDM (Keltan6750) | 35 parts by weight |
| Carbon black C (Asahi #35G, produced by Asahi Carbon Co., Ltd. average particle diameter: 60 to 100 nm iodine absorption amount: 16 to 28 g/kg; DBP oil absorption amount: 44 to 60 ml/100 g) | 19 parts by weight |
| Carbon black B (Seast G-SO) | 38 parts by weight |
| Organic peroxide (Perkadox 14, produced by Kayaku Akzo Corporation) | 1.3 parts by weight |
| Sulfur | 1.3 parts by weight |
| Vulcanization accelerator (Nocceler TBZTD, produced by Ouchi Shinko Chemical Industrial Co., Ltd.) | 0.4 parts by weight |

Comparative Example 9

In Comparative Example 8, the amount of the carbon black C was changed to 24 parts by weight, and that of the carbon black B was changed to 48 parts by weight, respectively.

Comparative Example 10

In Comparative Example 8, the amount of the carbon black C was changed to 29 parts by weight, and that of the carbon black B was changed to 54 parts by weight, respectively.

The test pieces obtained in the above Examples and Comparative Examples were measured and evaluated for their hardness, dynamic magnification, fatigue resistance, and heat resistance.

Hardness: according to JIS K6253-3 corresponding to ASTM D2240

Fatigue resistance (extended fatigue life): Measurements were carried out using a constant elongation fatigue tester FT-3103 (produced by Ueshima Seisakusho Co., Ltd.) under the following conditions, and the mean life time to failure (MTTF, N=10) until cut was determined.

Test piece: No. 6 dumbbell

Strain conditions: strain rate between 20 mm reference lines, 0 to 120%

Vibration frequency: 5 Hz

Ambient temperature: 100° C.

Dynamic magnification: The ratio of the elastic modulus of material having a deformation rate of 50%/sec to the elastic modulus of material having a deformation rate of 1%/sec was determined at Kd 50 Hz/Kst, and the rubber materials of Examples 1 to 3 and Comparative Examples 1 to 7 having the same hardness were evaluated in comparison with any of Comparative Examples 8 to 10, in which EPDM and SBR were used. The rubber material having a dynamic magnification less than that of the corresponding Comparative Example was evaluated as ⊚; the rubber material having a dynamic magnification that was 1 to 1.1 times that of the corresponding Comparative Example was evaluated as ◯; and the rubber material having a dynamic magnification exceeding 1.1 times that of the corresponding Comparative Example was evaluated as X.

Heat resistance: Hardness changes at 125° C. after 150 hours were determined.

The following table shows the obtained results, together with the numbers of the corresponding Comparative Examples, which were made comparison targets for dynamic magnification.

TABLE

| Measurement · evaluation item | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|---|
| Hardness (JIS A) | 70 | 66 | 75 | 64 | 74 | 65 | 70 | 70 | 70 | 69 | 65 | 70 | 75 |
| Fatigue resistance (×10³ times) | 230 | 120 | 360 | 105 | 18 | 21 | 120 | 200 | 210 | 200 | 25 | 30 | 35 |
| Dynamic magnification | ⊚ | ⊚ | ⊚ | ◯ | ⊚ | ⊚ | X | X | X | ◯ | — | — | — |
| Number of the | 9 | 8 | 10 | 8 | 10 | 8 | 9 | 9 | 9 | 9 | — | — | — |

TABLE-continued

| Measurement · evaluation item | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|---|
| corresponding Comparative Example | | | | | | | | | | | | | |
| Heat resistance | +1 | +1 | +1 | +1 | +1 | +1 | +1 | +1 | +1 | +1 | +10 | +11 | +11 |

The above results suggest the followings:

(1) The dynamic magnification of the rubber materials obtained in the Examples is less than that of the corresponding comparative rubber materials. Moreover, their fatigue resistance is excellent; specifically, each fatigue life exceeds 100,000 times. Furthermore, there is also almost no hardness change after the heat resistance test. Thus, the rubber materials obtained in the Examples are excellent in all of the characteristics.

(2) When Hs is within the range of 60 to 80, the weight ratio of carbon black A to carbon black B is ideally around 2/1. However, when the amount of carbon black A is equal to or less than the lower limit, or when the amount of carbon black B is equal to or more than the upper limit (Comparative Examples 1 and 4), the blending amount of carbon black B is more than that of carbon black A; thus, the dynamic magnification is inferior.

(3) Conversely, when the amount of carbon black A is equal to or more than the upper limit, or when the amount of carbon black B is equal to or less than the lower limit (Comparative Examples 2 and 3), the blending amount of carbon black B is less than that of carbon black A; thus, the fatigue resistance is inferior.

(4) When ethylene-α-olefin copolymer is replaced with other resins (Comparative Examples 5 and 6), the dynamic magnification is inferior.

(5) When ethylene-α-olefin copolymer is not compounded (Comparative Example 7), the dynamic magnification is inferior.

(6) When part of EPDM is replaced by SBR (Comparative Examples 8, 9, and 10), the dynamic magnification is inferior.

The invention claimed is:

1. A rubber composition for anti-vibration rubber comprising, based on 100 parts by weight of ethylene-propylene-diene-based copolymer rubber:
   (A) 32 to 60 parts by weight of carbon black A having an average particle diameter of 60 to 100 nm, an iodine absorption amount of 14 to 23 g/kg, and a DBP oil absorption amount of 100 ml/100 g or more;
   (B) 10 to 30 parts by weight of carbon black B having an average particle diameter of 40 to 50 nm, an iodine absorption amount of 35 to 49 g/kg, and a DBP oil absorption amount of 100 to 160 ml/100 g;
   (C) 2 to 10 parts by weight of ethylene-α-olefin copolymer; and
   (D) 0 to 16 parts by weight of silica.

2. The rubber composition for anti-vibration rubber according to claim 1, wherein 2 to 16 parts by weight of silica is compounded.

3. The rubber composition for anti-vibration rubber according to claim 1, wherein 1 to 8 parts by weight of (E) organic peroxide is further compounded as a crosslinking agent.

4. The rubber composition for anti-vibration rubber according to claim 3, wherein in combination with the organic peroxide, (F) sulfur is used at a weight ratio of 1/10 or less with respect to the organic peroxide.

5. An anti-vibration rubber produced by vulcanizing to mold the rubber composition for anti-vibration rubber according to claim 3.

6. The anti-vibration rubber according to claim 5, which has rubber hardness of 60 to 80.

7. The anti-vibration rubber according to claim 5, which is used as a center bearing support.

8. An anti-vibration rubber produced by vulcanizing to mold the rubber composition for anti-vibration rubber according to claim 4.

9. The anti-vibration rubber according to claim 8, which has rubber hardness of 60 to 80.

10. The anti-vibration rubber according to claim 8, which is used as a center bearing support.

* * * * *